Figure 1:
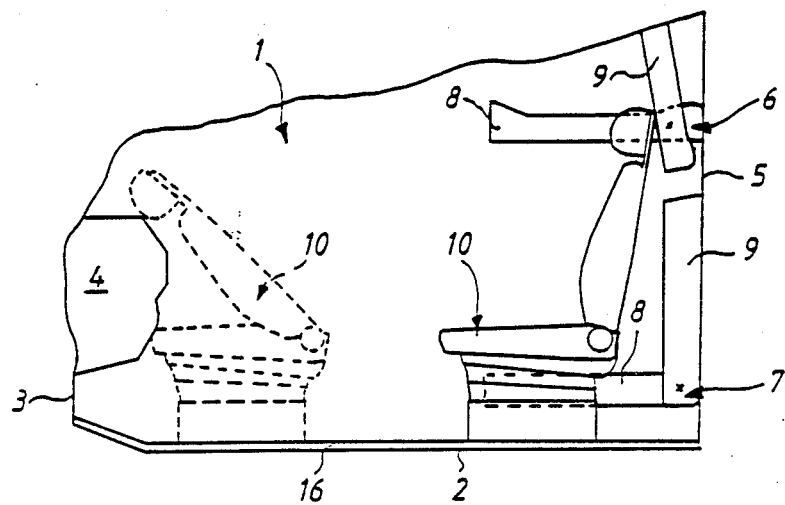

United States Patent [19]

Johansson

[11] Patent Number: 4,936,535
[45] Date of Patent: Jun. 26, 1990

[54] ARRANGEMENT FOR A LONGITUDINALLY SLIDABLE CHAIR FOR VEHICLE

[75] Inventor: Rolf Johansson, Trosa, Sweden

[73] Assignee: Saab-Scania Aktiebolag, Sweden

[21] Appl. No.: 326,668

[22] PCT Filed: Jun. 29, 1988

[86] PCT No.: PCT/SE88/00360
§ 371 Date: Feb. 27, 1989
§ 102(e) Date: Feb. 27, 1989

[87] PCT Pub. No.: WO89/00115
PCT Pub. Date: Jan. 12, 1989

[30] Foreign Application Priority Data

Jul. 1, 1987 [SE] Sweden .............................. 8702719

[51] Int. Cl.$^5$ ............................................ F16M 13/00
[52] U.S. Cl. ..................................... 248/430; 297/344
[58] Field of Search ............... 248/419, 420, 424, 425, 248/429, 430; 297/344

[56] References Cited

U.S. PATENT DOCUMENTS

| | | |
|---|---|---|
| 1,735,518 | 11/1929 | Valkenburg et al. |
| 1,942,998 | 1/1934 | Browne .......................... 248/424 X |
| 2,122,645 | 7/1938 | Jacobs ............................ 248/429 X |
| 2,234,442 | 3/1941 | Lustig ............................ 248/420 |
| 2,335,254 | 11/1943 | Atwood et al. ................ 248/429 |

FOREIGN PATENT DOCUMENTS 571433 5/1924 France .............................. 248/430

Primary Examiner—David L. Talbott
Attorney, Agent, or Firm—Ostrolenk, Faber, Gerb & Soffen

[57] ABSTRACT

The invention relates to an arrangement for a vehicle seat (10) which is designed displaceable in the longitudinal direction along at least one rail (14) fixed in a vehicle, there being arranged between the vehicle seat (10) and the rail (14) roller elements (38,102) which, during a command movement, are brought to bear against the rail (14) so that the vehicle seat (10) can be moved freely by the roller elements (38,102) rolling against the rail (14).

18 Claims, 2 Drawing Sheets

ARRANGEMENT FOR A LONGITUDINALLY SLIDABLE CHAIR FOR VEHICLE

The present invention relates to an arrangement for a vehicle seat which is designed displaceable in the longitudinal direction along at least one rail fixed in the vehicle, there being arranged between the vehicle seat and the rail a locking mechanism which releaseably locks the position of the vehicle seat relative to the rail.

It is known to improve the comfort of those travelling in a vehicle by designing the vehicle seats so that they are displaceable in the longitudinal direction in the compartment area of the vehicle. A mechanism for longitudinal displacement which is commonly used for this purpose comprises two elongate, parallel rail mechanisms which are located close by each other and which each comprise two rails which can be displaced relative to each other.

The one rail is firmly connected to the vehicle seat while the other rail is attached to the floor of the compartment area. The rails thereby delimit a groove in which balls are arranged to permit longitudinal displacement of the vehicle seat.

Such longitudinal displacement mechanisms have the disadvantage that they only permit a limited range of longitudinal adjustment of the vehicle seat. The balls are in fact not guided in the longitudinal direction in the groove so that they are distributed unevenly during long longitudinal displacement movements, which results in a sluggish longitudinal displacement mechanism which is difficult to operate.

The limitation of the adjustment range is particularly noticeable in lorries having a so-called sleeping cab in which a bed is pivotably arranged between a use position and a non-use position behind the vehicle seats.

In such a cab it is in fact desirable to be able to displace at least the passenger seat between a front end position close by the instrument panel, when the bed is in the use position, and a rear end position close by the rear wall of the cab, when the bed is not in the use position.

The object of the present invention is to eliminate the abovementioned disadvantages in order to permit such a displacement of a vehicle seat between a front end position close by the instrument panel and a rear end position close by the rear wall of the cab. To this end the invention is characterized in that the locking mechanism comprises at least one roller element which, upon a manually actuable release movement, is brought to bear in a force-transmitting manner against the rail, by which means locking elements incorporated in the locking mechanism are released from a position locking the vehicle seat relative to the rail.

When the arrangement according to the invention is acted upon by the release movement, the roller element is brought to bear against the rail, in which connection the roller element, by rolling against the rail, permits simple adjustment of the seat position even when the rail is extremely long.

Figure 3:
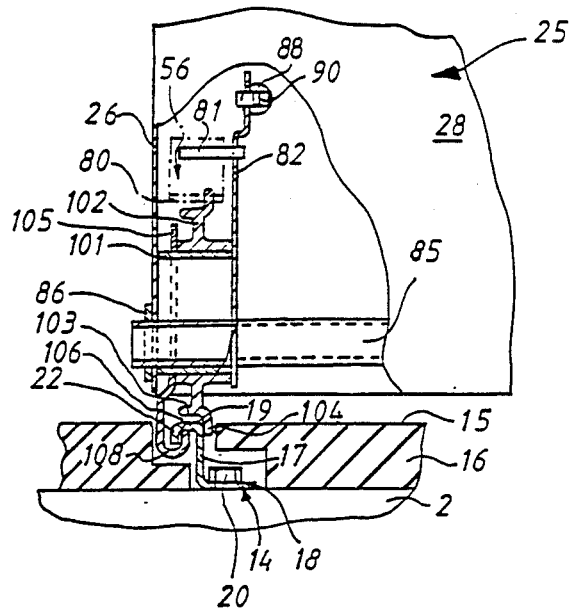

Other features characterizing the invention emerge from the subsequent patent claims and the description of an embodiment illustrating the invention. In the description reference is made to the attached figures in which FIG. 1 shows a diagrammatic side view of a lorry cab equipped with a vehicle seat with an arrangement according to the invention, FIG. 2 shows a side view of the arrangement according to the invention, and FIG. 3 shows a section along A—A of the arrangement according to the invention shown in FIG. 2.

The present description relates to the passenger side of a vehicle cab, since a vehicle seat on this side should, for reasons of comfort, be displaceable in the longitudinal direction a further distance than the seat on the driver's side. In spite of this there is of course nothing to prevent the present invention being applied to a driver's seat.

Figure 2:
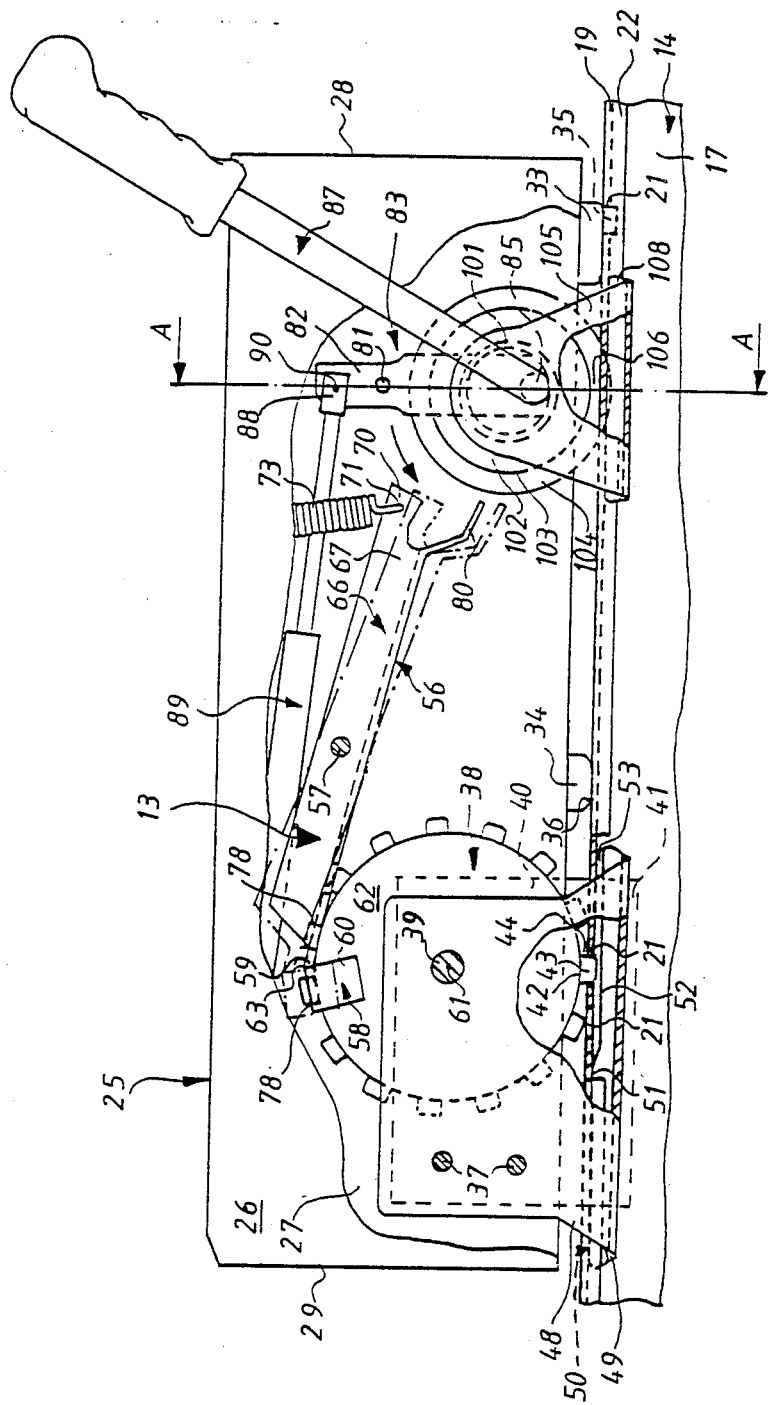

FIG. 1 shows the passenger side of a compartment area 1 of a vehicle cab. The vehicle cab is arranged on a conventional framework (not shown) which constitutes part of a vehicle chassis. The cab is provided with a cab floor 2 which separates the compartment area 1 from the vehicle chassis. In its front part the cab floor 1 connects to an essentially vertical cowl panel 3 which delimits the compartment area 1 at the front. Above the cowl panel 3 an instrument panel 4 is arranged. The compartment area 1 is delimited at the back by a rear wall 5 against which an upper and a lower bed 6, 7 are arranged.

Each bed 6, 7 consists of a longer and a shorter part 8, 9 which are both arranged transverse in the compartment area 1. The longer parts 8 are firmly attached to the rear wall 5 behind a driver's seat (not shown) in a plane position essentially parallel to the cab floor 2, while the shorter parts 9 are pivotably arranged between an upper and a lower position in the rear wall 5 behind a passenger seat 10.

In its lower position the respective shorter part 9 is located in the same plane as the respective longer part 8, with formation of an upper and a lower interconnected lying surface.

In its upper position the respective shorter part 9 bears against the rear wall 5, a space thus being formed which permits displacement of the passenger seat 10 in the longitudinal direction between a front end position close by the instrument panel 4 and a rear end position close by the rear wall 5, without the adjustment possibilities thereof being limited to any great extent by the beds 6, 7. In FIG. 1 the passenger seat 10 is shown by broken lines in the front end position, while it is shown by complete lines in the rear end position.

The passenger seat 10 is displaceable along two elongate, parallel rails 14 which are located at a mutual distance from each other in the cab floor 2 (not shown in FIG. 1). The rails 14, which extend over the entire length of the compartment area, are sunk in a rubber matting 16 fixed to the floor 2. This matting is so thick that its top surface is on a level with an upper leg 19 of the rails 14. In this way a flat floor surface is obtained in front of and behind the passenger seat 10 when the latter is in its end positions.

When the passenger seat 10 is placed in its rear end position, a person sitting in the seat 10 can make use of a considerable floor space in front of the seat 10, which increases the comfort in the compartment area 1. In contrast, when the passenger seat 10 is in its front end position, the flat floor space obtained behind the seat 10 increases freedom of movement when the beds 6, 7 are to be used.

Each rail 14 consists, as emerges from FIGS. 2 and 3, of a profiled, elongate sheet element having a vertical base part 17 from which project two horizontal legs 18, 19. The one leg 18 is attached by bolt connections 20 to the cab floor 2, while the second leg 19 is directed towards a seat support, described below, and is designed with holes 21 arranged in a row and designed at equal distances from each other, of which holes only three are shown in the figures. The leg 19 is also designed with a downward turned flange 22 whose function is described below.

The passenger seat 10 consists of a conventional seat part (not shown) which is firmly connected to a seat support 25. The seat support 25 consists of two side plates 26, 27 which are parallel in a vertical plane and which are connected to each other by a front and a rear end plate 28, 29.

The upper parts of both the side plates 26, 27 and the end plates 28, 29 are designed with inwardly directed support surfaces (not shown) against which the seat part is attached.

Between the passenger seat 10 and the rails 14 a locking mechanism 13 is arranged which locks the position of the passenger seat 10 relative to the rails 14. The locking mechanism has the same design on both the rails, but in the following only its design on one rail is described, its mirror-image design on the other rail being taken as understood.

The locking mechanism 13 comprises locking elements in the form of front and rear supports 33, 34 arranged towards the lower part of the side plate 26. The supports 33, 34 bear from above against the leg 19 of the rail 14 and transfer the seat load to the rail 14. The front support 33 moreover comprises a downwardly directed locking stud 35 which passes through one of the holes 21 in the rail 14.

In the side plate 26 between the rear support 34 and the rear end plate 29 a roller element in the form of a wheel 38 is rotatably mounted about a horizontal axle 39 extending in the transverse direction of the passenger seat 10.

The one end of the axle 39 is fixed to the side plate 26, while its other end is fixed to an attachment 40 connected parallel to the side plate and located at a distance therefrom. The lower part 41 of the attachment 40 lies inside the rail 14 and prevents lateral displacement of the vehicle seat during a longitudinal displacement movement described below.

The wheel 38 is designed with a roll surface 42 in which there are arranged radially projecting teeth 43 which interact with the holes 21 in the leg 19. In this connection the wheel 38 is arranged in such a way that there is a gap 44 between the roll surface 42 of the wheel 38 and the leg 19.

A rear seat attachment 48 is rotatably arranged about the axle 39 in a position between the wheel 38 and the side plate 26. The seat attachment 48 is designed in its lower part with a U-shaped section 49 which encloses the downwardly turned flange 22 of the leg 19 on the rail 14. The end 50 of the seat attachment 48 directed towards the rail 14 is designed with a higher and a lower step 51, 52. The higher step 51 bears with clamping force against the leg 19 in order to prevent the vehicle seat 10 from coming loose in the event of a collision or other accident, while the lower step 52 delimits a gap 53 between the end 50 of the rear seat attachment 48 and the leg 19.

The clamping force of the seat attachment 48 against the leg 19 can be adjusted by virtue of the fact that the seat attachment 48 is rotatable about the axle 39 and is fixed in position by means of two adjusting screws 37.

The wheel 38 cooperates with a locking shaft 56 consisting of an elongate sheet element which is arranged in parallel relative to the side plates and which is rotatably mounted about an axle 57 fixed at right angles to the side plates 26, 27.

The end of the locking shaft 56 directed towards the wheel 38 is designed with a relatively short U-shaped area 58 which is formed by the outer end section of a base part 59 of the locking shaft 56 and by two downwardly directed legs 60. The legs 60 surround the wheel 38 and extend in towards the centre of rotation 61 of the wheel 38 in order thereby to centre the locking shaft 56 over the wheel 38.

The U-shaped area 58 is at an angle with respect to the wheel 38 by means of a bend 63 made by the base part 59, which bend 63 connects the U-shaped area 58 to a relatively long U-shaped area 66 which is formed by the base part 59 and two upwardly directed legs 67.

At the one end 70 of the relatively long U-shaped area 66 one of the upwardly directed legs 67 is designed with a hole 71 which accommodates one end of a tension spring 73 whose other end is fixed, in a manner not shown in detail, in the side plate 26.

The tension spring 73 aims to turn the locking shaft 56 around its axle 57 in order thereby to bring at least two of the teeth 43 of the wheel 38 into engagement in holes 78 corresponding to the teeth 43 and made in the base part 59.

At the end of the locking shaft 56 directed towards the tension spring 73 the base part 59 merges into a downwardly turned tongue-shaped section 80. This is designed to be acted upon by a command mechanism 83 which, as emerges from the following, upon manual actuation can cause the locking shaft 56 to turn around the axle 57 from and into a position cooperating with the teeth 43 of the wheel 38.

In the command mechanism there is a carrier element 81, here designed as a cylindrical pin, which is fixed to the upper part of a vertical lever 82 whose lower part is arranged fixed in terms of rotation on a hollow axle 85 extending horizontally across the seat support 25. One end 88 of an actuation element 89 of the piston cylinder type is rotatably arranged about an axle 90 on the respective lever 82, while the other end of the actuation element 89 is rotatably arranged about an axle (not shown) in the side plate 26. The actuation element 89 is thus designed so as to continuously press the lever 82, and thus also the hollow axle 85, towards a front end position.

The hollow axle 85 is rotatably mounted in a bearing 86 arranged on each side plate 26, 27 and is caused to execute a rotational movement by means of a rod control 87 shown only in FIG. 2 and mounted fixed in terms of rotation on the hollow axle 85.

A tubular hub 101 surrounds the end of the hollow axle 85 and is eccentrically fixed on the hollow axle 85. Arranged rotatably about the hub 101 are a roller element and a front seat attachment 105. The roller element here comprises a support wheel 102, which is designed with a peripheral support surface 103, and a flange 104 directed radially outwards. The flange 104 lies inside the rail 14 in order to guide the seat during the longitudinal displacement movement described below, while the support surface 103 delimits a gap 106 between the support wheel 102 and the leg 19. The seat attachment 105 has in its lower part a U-shaped area 108 which encloses the downwardly directed flange 22 of the leg 19 and which bears with clamping force against the leg 19 in order to prevent the seat 10 from coming loose.

The invention has the following function.

Since the arrangement according to the invention is arranged symmetrically on the seat support, the procedure for the arrangement is only described in the case of the one rail, it being taken as understood that a corresponding procedure also takes place in the case of the other rail.

The vehicle seat 10 now described bears against the rails 14 and is securely locked relative to these by means of the locking mechanism, so that it cannot come loose in the event of a collision or other accident. In order to release the locking and permit displacement of the vehicle seat 10, the hollow axle 85 is turned, in the direction of the arrow shown in FIG. 2, by means of the rod control 87. When the hollow axle 85 and thus also the wheel hub 101 fixed eccentrically on the hollow axle 85 are turned, there is a successive reduction, due to the eccentricity, in the gap 106 between the support surface 103 of the support wheel 102 and the leg 19 of the rail 14 at the same time as the front seat attachment 105 is successively lowered to a position lying free from the rail 14.

When the support surface 103 of the support wheel 102 has come to bear against the leg 19, upon continued activation of the rod control 87 the seat support 25 is forced to turn about an imaginary horizontal axis 36, transverse to the vehicle seat 10, on the rear support 34 of the seat support 25.

During the rotational movement the support surface 42 of the toothed wheel 38 approaches the leg 19 at the same time as the upper shoulder 51 of the rear seat attachment 48 is lowered to a position lying free from the rail 14, and at the same time as the locking stud 35 of the front support 33 is displaced upwards in the recess 21 in the leg 19.

As soon as the support surface 42 of the toothed wheel 38 has come to bear against the leg 19, upon continued activation of the rod control 87 the seat support 25 is forced to turn about an imaginary horizontal axis transverse the vehicle seat 10 through the bearing point of the support surface 42 against the leg 19. This results in the rear seat supports 34 being raised from the leg 19 at the same time as the locking stud 35 of the front support 33 is fully released from the recess 21 in the rail 14. The entire load of the seat support 10 is thus transferred to the rails 14 via the toothed wheel 38 and support wheel 102.

During the process described hitherto the lever 82 attached to the hollow axle 85 has swung downwards so that the actuation element 89 attached to the lever 82 is compressed, at the same time as the carrier element 81 of the lever 82 has come to bear against the tongue-shaped section 80 of the locking shaft 56.

Upon continued actuation of the rod control 87 the locking shaft 56 is forced to turn about the axle 57 and assume the position shown in FIG. 2 by means of broken lines. The holes 78 in the base part 59 are thus released from the teeth 43 of the respective wheel 38, so that the locking cooperation between the wheel 38 and the locking shaft 56 ends. By means of the wheels 38, 102 rolling along the rails 14 it is now possible to displace the passenger seat 10 to an arbitrary position between the front end position close by the instrument panel 4 and a rear end position close by the rear wall 5.

When the passenger seat 10 is placed in the selected position along the rails 14, the rod control 87 is let go. When the rod control 87 is let go, the actuation element 89 presses the lever 82 and, thus, the hollow axle 85 against the front end position of the hollow axle 85, at the same time as the spring 73 turns the locking shaft 56 about the axle spindle 57 so that the holes 78 in the base part 59 are brought into locking cooperation with the teeth 43 of the wheel 38.

Thereafter, the above procedure takes place in reverse, the passenger seat 10 being again brought to bear against the rails 14 and lock securely relative to these.

When the rod control 87 is let go and the seat 10 seeks to assume the locked position, it can happen that the base part 59 of the locking shaft 56 is brought to bear against the top of one or more of the teeth 43 of the respective wheel 38. When this occurs, the return movement of the lever 82, and thus also of the hollow axle 85, is limited because the carrier element 81, during the initial stage of the return movement, comes to bear against the end 70 of the locking shaft 56. The front support 32 and its locking stud 35 are thereby prevented from cooperating with the leg 19, which results in a person sitting in the passenger seat 10 feeling that it is unlocked. In order to bring the passenger seat 10 to a completely locked position, it is subjected to a relatively light knock or jerk, the locking shaft 56 being brought directly into locking cooperation with the wheel 38 at the same time as the support 33 and its locking stud 35 are brought into locking cooperation with the leg 19.

The invention should not be regarded as being limited by the embodiment described, but can be modified, within the scope of the following patent claims, in a number of alternative embodiments.

I claim:

1. An arrangement for a longitudinally slidable vehicle seat comprising:
   a seat to be moved longitudinally; at least one rail along which the seat is to be slidable in the longitudinal direction;
   a locking mechanism for releasably locking the position of the seat longitudinally along the rail, the locking mechanism comprising:
   locking elements at the locking mechanism and movable into engagement with the rail for locking the seat relative to the rail and movable away from the rail for freeing the seat to be slid longitudinally relative to the rail;
   at least one roller supported to the seat and normally spaced from the rail;
   locking mechanism release means for moving the roller to bear in a force transmitting manner against the rail, wherein upon the roller bearing against the rail, the locking mechanism is moved to move the locking elements to release the locking elements from their position locking the seat relative to the rail, thereby freeing the seat to be slid longitudinally relative to the rail.

2. The arrangement of claim 1, wherein the roller comprises an axle supported on the seat, a hub eccentrically supported on the axle and a wheel rotatably arranged about the hub, such that operation of the release means rotates the wheel and the hub eccentrically around the axle for moving the eccentric wheel from being spaced from the rail to bearing against the rail.

3. The arrangement of claim 1, wherein in the locked position of the seat, the locking elements engage the rail while the roller is spaced from the rail, and upon the roller bearing upon the rail, the locking elements are moved from the rail for freeing the seat for longitudinal sliding, and the roller being supported for rolling over the rail as the seat is slid longitudinally.

4. The arrangement of claim 1, wherein the locking mechanism comprises two of the rollers normally supported by the seat to be spaced from the rail, and spaced apart along the longitudinal direction of the rail;

the release means being operable for operating the first of the rollers into bearing against the rail during a first part of the release movement of the release means and for operating the second of the rollers into bearing against the rail during continued release movement of the release means, such that the bearing of the first and then the second rollers against the rail moves the locking elements of the locking mechanism to free the seat to be slid relative to the rail.

5. The arrangement of claim 4, further comprising a second of the rails parallel to the first mentioned rail and a second of the locking mechanisms for the second rail, the locking mechanisms for the first rail and for the second rail being connected for operating together.

6. The arrangement of claim 4, wherein the locking elements comprise a front support, and a rear support which is longitudinally separated along the rail from the front support; in the locked condition of the seat, both the front and the rear supports engage the rail with the rollers spaced off the rail; upon operation of the release means for moving the rollers to engage the rail, and upon the rollers bearing against the rail, the release means moves the front and rear supports from the rail to free the seat for sliding relative to the rail and the rollers rolling over the rail during longitudinal sliding of the seat over the rail.

7. The arrangement of claim 6, wherein the rail has a plurality of holes disposed along it in the longitudinal direction; one of the supports comprises a locking stud for engaging in that hole longitudinally along the rail where the locking stud is then positioned so that with the one support at the rail, the locking stud moves into the respective hole in the rail to fix the vehicle seat against sliding in the longitudinal direction.

8. The arrangement of claim 7, wherein the locking stud is located toward the longitudinal end of the seat toward which the first of the rollers to contact the rail is located.

9. The arrangement of claim 4, wherein the locking elements engage the rail while the rollers are spaced from the rail; upon at least one of the rollers bearing against the rail, the locking elements are moved from the rail for freeing the seat for longitudinal sliding and at least one of the rollers being supported for rolling over the rail as the seat slides longitudinally.

10. The arrangement of claim 9, wherein the one roller comprises an axle supported on the seat, a hub eccentrically supported on the axle and a wheel rotatably arranged about the hub, such that operation of the release means rotates the wheel and the hub eccentrically around the axle for moving the eccentric wheel from being spaced from the rail to bearing against the rail.

11. The arrangement of claim 10, wherein the release means comprises a pivotable rod connected with the hub for rotating the hub.

12. The arrangement of claim 10, further comprising a seat attachment attached to the hub and including means for engaging the rail, the seat attachment and the rail engaging means thereof being so shaped that with the hub in position for holding the one roller above the rail, the rail engaging means of the seat attachment engages the rail to fix a vertical lifted position of the seat, and with the hub in position for bringing the one roller to the rail, the rail engaging means is moved below and out of engagement with the rail.

13. The arrangement of claim 10, wherein the second roller comprises a wheel having radially projecting teeth on it; the rail having longitudinally spaced holes therealong, such that when the second roller wheel has been moved to bear against the rail and as it rolls against the rail, at least one of the teeth of the second roller engages in the then adjacent hole in the rail.

14. The arrangement of claim 13, wherein the locking mechanism further comprises tooth engaging means for lockingly engaging at least one of the teeth of the second roller for preventing rotation of the second roller.

15. The arrangement of claim 14, wherein the tooth engaging means comprises a shaft having a hole in its side adapted for engaging with and disengaging from at least one of the teeth on the second roller and the release means being operable for operating the shaft for selectively engaging with and disengaging from the tooth on the second roller.

16. The arrangement of claim 13, wherein the locking mechanism further comprises a locking shaft including means thereon for engaging at least one of the teeth of the second roller for preventing rotation of the second roller, the locking shaft being mounted for rotation between an engaged position where it engages one of the teeth of the second roller and a disengaged position where it is disengaged from the teeth of the second roller;

the release means being connected with the locking shaft for moving the locking shaft to disengage from the teeth of the second roller element wheel.

17. The arrangement of claim 16, wherein the release means further comprises a lever biased for moving the locking shaft for releasing the locking shaft to disengage from the teeth of the wheel.

18. The arrangement of claim 17, wherein the release means comprises a manually operable rod operably connected with the hub for rotating the hub and operable into engagement with the locking shaft for moving the locking shaft off engagement with the teeth of the wheel.

* * * * *